United States Patent
Thurow et al.

(10) Patent No.: US 11,030,725 B2
(45) Date of Patent: Jun. 8, 2021

(54) NOISE-CANCELLING FILTER FOR VIDEO IMAGES

(71) Applicant: Searidge Technologies Inc., Ottawa (CA)

(72) Inventors: Christian Tim Thurow, Berlin (DE); Alex Sauriol, Ottawa (CA); Moodie Cheikh, Ottawa (CA)

(73) Assignee: Searidge Technologies Inc., Ottawa (CA)

( * ) Notice: Subject to any disclaimer, the term of this patent is extended or adjusted under 35 U.S.C. 154(b) by 0 days.

(21) Appl. No.: 15/780,965

(22) PCT Filed: Dec. 1, 2016

(86) PCT No.: PCT/CA2016/051413
§ 371 (c)(1),
(2) Date: Jun. 1, 2018

(87) PCT Pub. No.: WO2017/091900
PCT Pub. Date: Jun. 8, 2017

(65) Prior Publication Data
US 2020/0167899 A1   May 28, 2020

Related U.S. Application Data

(60) Provisional application No. 62/263,122, filed on Dec. 4, 2015.

(51) Int. Cl.
*G06T 5/00* (2006.01)
*G06T 7/194* (2017.01)
*G06T 5/20* (2006.01)

(52) U.S. Cl.
CPC .............. *G06T 5/002* (2013.01); *G06T 5/20* (2013.01); *G06T 7/194* (2017.01);
(Continued)

(58) Field of Classification Search
None
See application file for complete search history.

(56) References Cited

U.S. PATENT DOCUMENTS

| 8,260,076 B1 * | 9/2012 | Yang | G06T 5/002 |
| | | | 382/261 |
| 2009/0185757 A1 * | 7/2009 | Lee | G06T 5/004 |
| | | | 382/266 |

(Continued)

FOREIGN PATENT DOCUMENTS

| WO | 2009067819 A1 | 6/2009 |
| WO | 2015127535 A1 | 9/2015 |

OTHER PUBLICATIONS

Q. Yang, K. Tan and N. Ahuja, "Real-time O(1) bilateral filtering," 2009 IEEE Conference on Computer Vision and Pattern Recognition, Miami, FL, 2009, pp. 557-564, doi: 10.1109/CVPR.2009.5206542. (Year: 2009).*

(Continued)

*Primary Examiner* — Justin P. Misleh
(74) *Attorney, Agent, or Firm* — Borden Ladner Gervais LLP; Jason Mueller-Neuhaus

(57) ABSTRACT

A video processing system and method apply a bilateral filter to images of a video stream in real time. The bilateral filter is executed and applied using a graphics processing unit (GPU) controlled by a processor. The bilateral filter may be encoded in a shader operated by the GPU. The GPU or processor may be configured to compress one or more video images of the video stream. Blurring or smoothing of the video images by the shader-implemented bilateral filter may reduce image noise thereby increasing a compression performance. The bilateral filter may be applied exclusively to a background of the video images which are substantially free of sharp edges. The video stream may be received from (Continued)

cameras covering an area of an airport, which may be an airport apron.

18 Claims, 5 Drawing Sheets

(52) U.S. Cl.
CPC ............ *G06T 2200/28* (2013.01); *G06T 2207/10016* (2013.01); *G06T 2207/20028* (2013.01); *G06T 2207/30232* (2013.01)

(56) References Cited

U.S. PATENT DOCUMENTS

| | | | |
|---|---|---|---|
| 2011/0249133 A1* | 10/2011 | Zhou | H04N 19/102 348/222.1 |
| 2013/0258138 A1* | 10/2013 | Ma | H04N 5/23212 348/239 |
| 2013/0336585 A1* | 12/2013 | Tian | G06T 5/002 382/167 |
| 2014/0098185 A1* | 4/2014 | Davari | H04N 5/23238 348/36 |
| 2014/0176548 A1 | 6/2014 | Green | |
| 2016/0039534 A1* | 2/2016 | Agrawal | G06K 9/00785 348/144 |

OTHER PUBLICATIONS

Chen et al., "Real-time Edge-Aware Image Processing with the Bilateral Grid," Oct. 2007, ACM SIGGRAPH conference proceedings, MIT, 9 pages.

Durand F et al., "Fast Bilateral Filtering for the Display of High-Dynamic-Range Images," ACM Transactions on Graphics, Jul. 2002, pp. 257-266.

Eden A et al., "Seamless Image Stitching of Scenes with Large Motions and Exposure Differences," 2006 IEEE Computer Society Conference on Computer Vision and Pattern Recognition, Jun. 2006, vol. 2, pp. 2498-2505.

European Patent Application No. 16869445.3, Extended European Search Report dated Jun. 5, 2019.

International Patent Application No. PCT/CA2016/051413, International Preliminary Report on Patentability dated Mar. 6, 2018.

International Patent Application No. PCT/CA2016/051413, International Search Report and Written Opinion dated Jan. 24, 2017.

Langs et al., "Filtering Video Volumes using the Graphics Hardware," Scandinavian Conference on Image Analysis, Jun. 2007, pp. 878-887.

Larsson et al., "A Case Study of Parallel Bilateral Filtering on the GPU," Mälardalen University, School of Innovation, Design and Engineering, 2015, 52 pages.

Pal et al., "Hardware Software Co-design of a fast bilateral filter in FPGA," Annual IEEE India Conference, Dec. 2013, 6 pages.

* cited by examiner

NOISE-CANCELLING FILTER FOR VIDEO IMAGES

FIELD

The present disclosure relates to filtering of video images and video feeds from video cameras used in airport monitoring and surveillance.

BACKGROUND

In the field of airport monitoring and surveillance, video cameras are used to provide live and recorded video feeds of selected areas of an airport or airport surface, such as the airport apron where airplanes are parked and passengers and cargo are loaded and unloaded. Airport aprons are busy at typical airports, with a multitude of different vehicles and persons moving about to perform the multitude of tasks together constituting the airport's operations. Airport aprons are typically extensive in physical dimensions, and a number of cameras are required in order to provide adequate coverage of the entire apron. The numerous video feeds are presented on a number of displays, typically in a control room, are these are monitored by one or more air traffic control operators. It is necessary for the displays viewed by the operators to be generated and provided in real-time based on the video feeds such that the displays provide an accurate and current view of the activities on the airport apron.

In order to facilitate the operator's monitoring and surveillance task, it is known to apply different image processing techniques to the video images of one or more of the video streams in order to improve the clarity of the display presented to the operator. For example, WIPO International Publication No. WO/2015/127535, the entirety of which is incorporated herein by reference, teaches methods of image stitching and automatic colour correction of video feeds, including the use of texture mapping techniques to correct lens distortion.

Some known techniques employ computer vision methods, being methods which are configured to process digital images to generate contextual information, for example to identify different discrete objects in a camera's field of view, such as moving objects relative to a background, as taught in WIPO International Publication No. WO/2009/067819, the entirety of which is incorporated herein by reference.

Some known computer vision techniques employ bilateral filters for noise cancelling. A bilateral filter is a non-linear, edge-preserving and noise-reducing smoothing filter for images. It is derived from the Gaussian blur filter. Each pixel in the original image is replaced by a weighted average of intensity values from nearby pixels. This weight can be based on a Gaussian distribution. Crucially, the weights depend not only on Euclidean distance of pixels, but also on the radiometric differences (e.g. range differences, such as color intensity, depth distance etc.). This last aspect makes the filter edge preserving.

Known implementing algorithms for bilateral filters are computationally expensive, however, and this generally prevents the use of bilateral filters in real-time applications for video surveillance, including in airport monitoring surveillance.

Accordingly, improved and alternative techniques for real-time processing of video feeds are desirable, including when based on video feeds from multiple video cameras covering an airport apron for monitoring and surveillance purposes.

BRIEF DESCRIPTION OF THE DRAWINGS

Embodiments will now be described, by way of example only, with reference to the attached Figures.

DESCRIPTION

The present technique implements a noise-cancelling filter for real-time processing of video images by means of a shader that runs on a graphics processing unit (GPU). This enables the performance of a typically computationally expensive bilateral filter algorithm on large images (e.g. 1080p and larger) in real time.

A GPU is a specialized electronic circuit configured to manipulate and process image data more quickly and efficiently than a general-purpose central processing unit executing software instructions in memory. Contemporary GPUs incorporate many different image processing functionalities, such as texture mapping, polygon rendering, and geometric transformations, among others. Non-limiting examples of contemporary GPUs include the AMD Radeon™ Rx 300 series, the Nvidia GeForce™ GTX 10 series, and the Intel HD Graphics™ series.

Many GPUs are also configured with a programmable shader which performs image shading, which consists essentially in the modification of the visual attributes of an image's pixels, vertices, or textures in order to achieve an image effect, such as correction of hue, saturation, brightness, or contrast, as well as synthetic lighting, posterization, and distortion, among many other effects.

The present technique includes the implementation of a bilateral filter in a GPU shader. Although it was known to employ bilateral filters in computer vision methods, it was not known to employ such filters in real-time applications for video monitoring and surveillance, for example in the real-time processing of streaming video collected from multiple cameras covering an area of an airport such as an airport apron.

Figure 1:
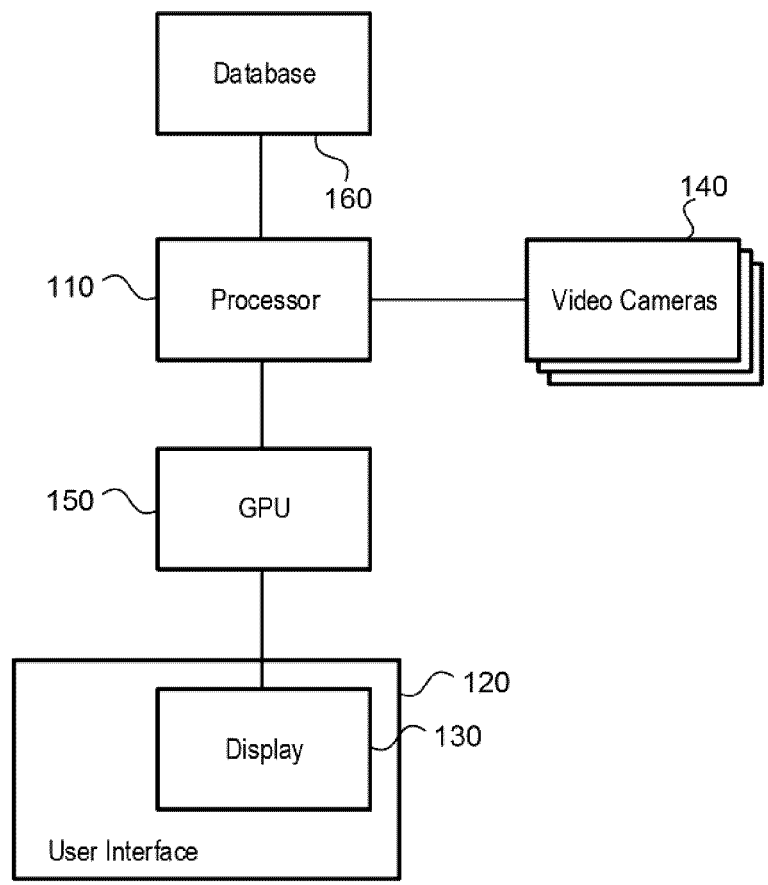
FIG. 1 is block diagram of a video image processing system.

FIG. 1 shows a noise-cancelling system 100 comprising a processor 110 configured to interface a user interface 120 which may include a display 130, one or more video cameras 140 interfaced to the processor 110, and a GPU 150 interface to the processor 150. The processor 110 is configured to receive one or more video streams of video images from the video cameras 140 and to control the GPU 150 to execute and apply the filter to the streams of video images. The filtered video streams may then be displayed on one or more displays 130 or stored in a database 160 interfaced to the processor 110.

Figure 2:
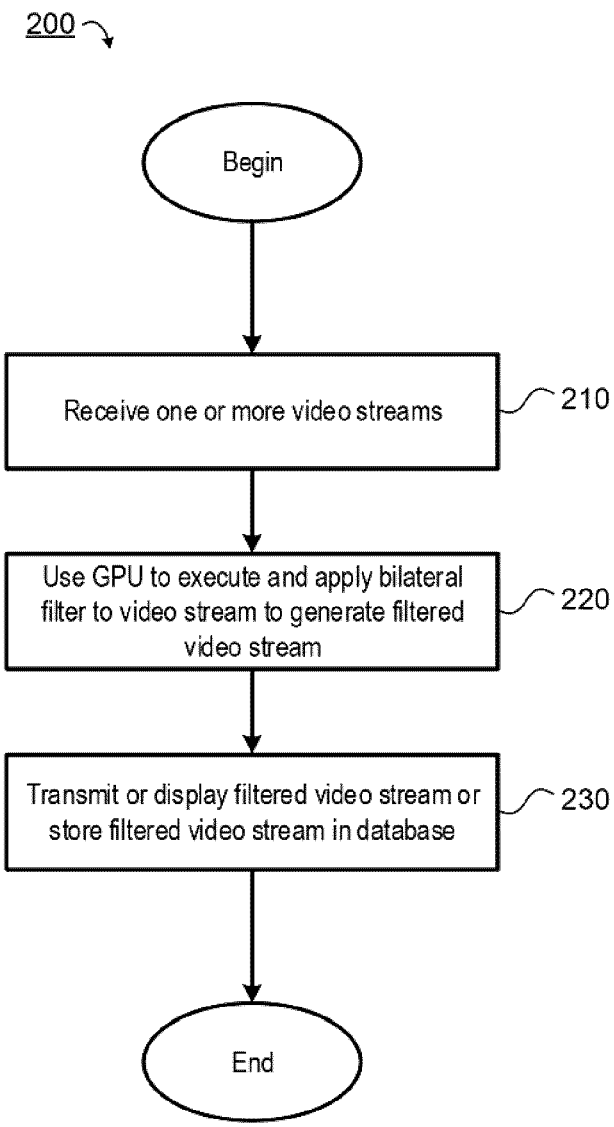
FIG. 2 is a flow chart of a video image processing method employing a bilateral filter applied by a GPU shader.

FIG. 2 shows a method 200 performable using the system 100. The system 100 interfaces the one or more video cameras 140 to receive one or more video streams (step 210) comprising a plurality of video images. The system 100 then uses the GPU 150 to execute and apply a bilateral filter on the video stream or video streams to generate a filtered video stream or streams comprising filtered video images (step 220). The filtered video stream may then be displayed on the display 130 or stored in the database 160 (step 230). The filtered video stream may also be transmitted to a network, which may be the Internet, for storage, display, or further processing.

The video stream may have any suitable mode, format, or encoding. In some embodiments, the video stream comprises a video stream of at least 1920×1080 pixels. Other configurations are possible.

In particular, in some embodiments, the GPU 150 shader of the noise-cancelling system 100 is configured to execute and apply to each video image of the video stream as follows a bilateral filter represented by:

$$J_s \frac{1}{k_s} \sum_{p \in \Omega} I(I_p, I_s) R(p, s) I_p \quad (1)$$

wherein $k_s$ is a normalization term, $$k_s \sum_{p \in \Omega} I(I_p, I_s) R(p, s) \quad (2)$$

wherein, s are the coordinates of the center pixel of window $\Omega$, p are the coordinates of the current pixel, $J_s$ is the resulting pixel intensity, and $I_p$, $I_s$ are the pixel intensities at p and s respectively.

In this application, the range kernel, or photometric similarity function, $I(I_s, I_p)$ is defined as:

$$I(I_s, I_p) \cdot \sigma kernel(s) e^{\frac{-(I_p - I_s)(I_p - I_s)}{2(\frac{1}{\sigma})^2}} \quad (3)$$

wherein $I_p$ and $I_s$ are vectors defining the pixel RGB colour values.

Similarly, the spatial kernel, or geometric distance function, R(p,s) is defined as:

$$R(p, s) \frac{1}{\sigma} kernel(s) kernel(p_x) kernel(p_y) \quad (4)$$

and is a one-dimensional symmetrical kernel, wherein $p_x$, $p_y$ are the positions of the current pixel with respect to the kernel size and dimension.

Finally, the kernel function is a simple Gaussian, when calculating the one-dimensional kernel values, and is given by:

$$kernel(i) \frac{kernel(s)}{\sigma} e^{\frac{-i^2}{2\sigma^2}} \quad (5)$$

which is valid for:

$$i \in \left[0, \frac{(kernelSize - 1)}{2} + 1\right] \quad (6)$$

which is the first half of the kernel, wherein the second half is symmetrical to the first half, and the calculation of the second half is trivial. In the above formula, kernel(s) denotes the value at the center of the kernel, which may be 0.39894.

Optimal fitting parameters $\sigma$ and kernel size may be determined by experimentation. Through empirical testing, it was determined that the best fitting parameters for the filter for application to a video stream in an air traffic control environment are: $\sigma$=10.0; and kernelSize=15.

The above configuration of a bilateral filter in a GPU shader enables the filter to be executed and applied to a video stream in real-time. In particular, knowledge of these parameters beforehand allows for a complete precomputation of the kernel coefficients, thus saving at least or about one third of computation time during runtime.

The above use of a GPU shader configured to implement a bilateral filter on a video stream in real-time generates a number of advantages.

For example, use of the noise-cancelling filter may be configured to enhance the compression rate of a video image or video stream and/or distort the background. The processor 110 or the GPU 150 may be configured to perform the compression in real-time. Background distortion may be achieved through smoothing (blurring) out preconfigured parts of one or more of the video image. For example, in the context of video surveillance and air traffic controlling, specific areas of a field of capture of each one of multiple video cameras covering an airport apron may be preconfigured as constituting background of video images of a video stream from that camera. Alternatively, the background distortion may be achieved without preselection of background parts of the video, where the background contains relatively few or no sharp edges, as the noise-cancelling filter may automatically blur or smooth parts of the video image that do not contain sharp edges. In this context, image patches with only low frequencies may be considered to contain no sharp edges. At the same time, existing edges in the image may be enhanced. Again, in the context of air traffic control video monitoring and surveillance, the video images constituting the video stream may include sharp edges only in connection with foreground objects of interest, where the background contains no sharp edges and is blurred or smoothed by the noise-cancelling filter.

State of the art compression algorithms work fully or partly in the frequency domain, where image noise is a material factor. The presence of more noise generally results in larger data and ultimately in high bandwidth needs. The present filter smooths out low frequency image patches (with high frequency noise through) and thus automatically reduces noise in the image. The improvement of compression over standard h.264 may be 2 to 3.5 times depending on the scene, if used in combination with h.264. Other compression methods and standards may also be used.

Figure 3:
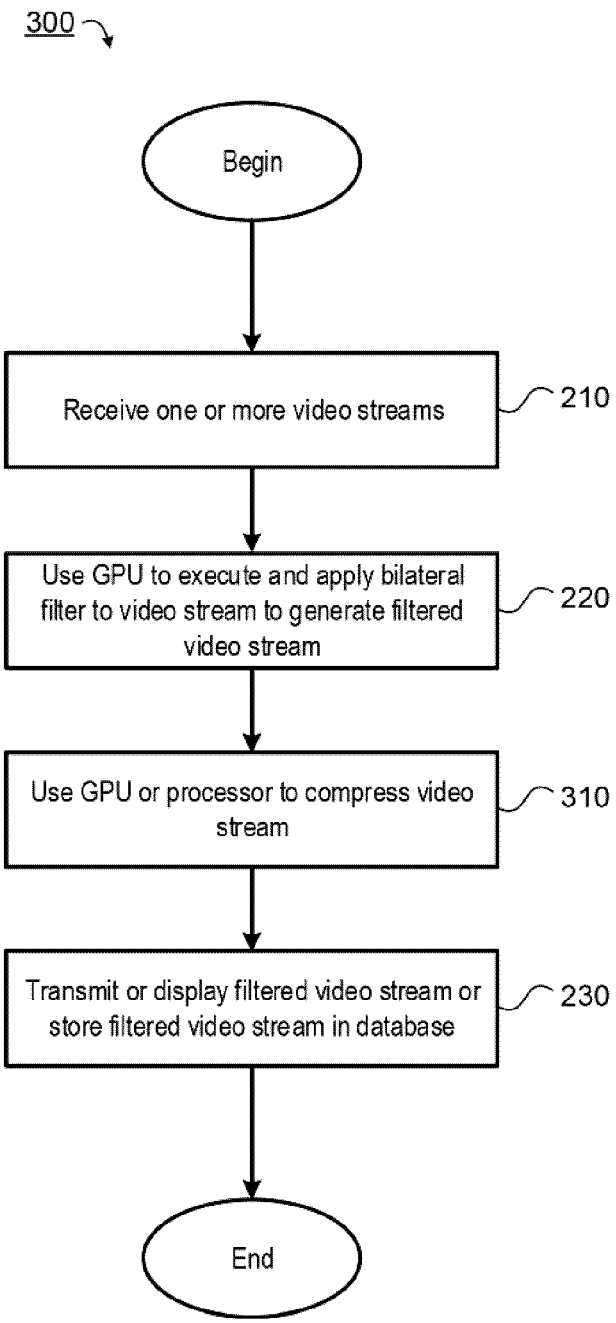
FIG. 3 is a flow chart of the video image processing method of FIG. 2 also employing compression.

Thus, FIG. 3 shows a method 300 performable using the system 100. The method 300 is identical to method 200, except that the GPU 150 or processor 110 is used to compress the video stream (step 310), which may include compressing one or more video images constituting the video streams, after the GPU 150 is used to execute and apply the bilateral filter on the images of the video stream to generate the filtered video stream comprising filtered video images (step 220), but before the filtered video stream is transmitted, or displayed on the display 130, or stored in the database 160 (step 230). Compression of the video stream facilitates and enables real-time transmission, display, or storage of the video stream given that the compression may reduce the bandwidth requirement of the video stream and thus the resource requirements of the transmission, display, or data storage means.

The present techniques also produce advantages from a human factors perspective. As noted above, airport monitoring and surveillance generally requires air traffic control operators to view and monitor displayed video streams over long periods of time. Due to the noise cancelling effect, the present techniques make the viewed image more stable and more visually pleasing, and thus safer to use over longer periods of time.

Due to the fact that the bilateral filter is edge preserving, objects of interest appear more clearly while the background appears slightly blurry. This directs the attention of the user, e.g. air traffic controller towards foreground. This is a desirable feature.

Moreover, an additional foreground enhancing module, which may be executed by the processor 110 or the GPU 150, may be used in combination with the system in order to enhance the foreground even further. Such additional module may include image segmentation software whereby parts of the image are specified to be foreground and other parts are specified to be background. The foreground enhancing module may generate segmentation information identifying foreground pixels and background pixels in real time, mark or otherwise identify the foreground pixels for separate processing, and everything else in the image may be processed with the bilateral filter as described above. Such separate processing may include, without limitation, histogram equalization, edge enhancement, or any other form of highlighting.

Figure 4:
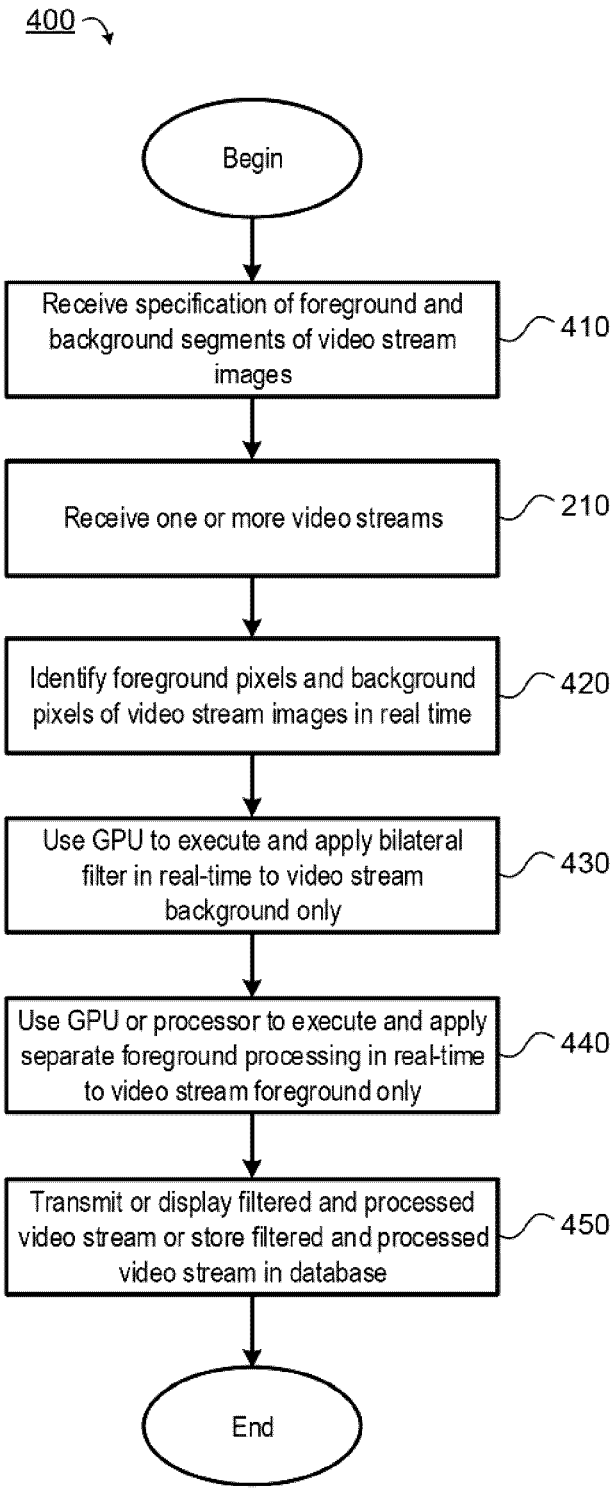
FIG. 4 is a flow chart of the video image processing method of FIG. 2 also employing additional foreground processing.

Thus, FIG. 4 shows a method 400 similar to method 200 and performable using the system 100. The system 100 receives, which may be via user interface 120, a specification of foreground and background segments of video images of a video stream (step 410). The system 100 interfaces the video camera 150 to receive a video stream (step 210) comprising a plurality of video images. The system 100 then uses the processor 110 or GPU 150 to identify foreground pixels and background pixels in the video stream images in real-time (step 420). The system 100 then uses the GPU 150 to execute and apply a bilateral filter on the background pixels only of the images of the video stream to generate a filtered background segment of the video images (step 430). Optionally, the GPU 150 or processor 110 may execute and apply separate processing on the foreground pixels of the video images of the video stream (step 440). The filtered and processed video stream may then be displayed on the display 130 or stored in the database 160 (step 450). The filtered and processed video stream may also be transmitted to a network, which may be the Internet, for storage, display, or further processing.

In the methods 200, 300, 400, the GPU 150 may be configured to apply the bilateral filter separately on each video stream of a plurality of video streams, each video stream being received from a corresponding camera. In such case, the GPU 150 may be configured, with respect to each video stream, to apply the bilateral filter sequentially and separately to each incoming video image of the video stream as it is received.

Alternatively, the GPU 150 may be configured to apply the bilateral filter on a composite video stream including composite video images formed by combining or stitching corresponding video images of the different video streams, which in some embodiments is done according to the teachings of WIPO International Publication No. WO/2015/127535, the entirety of which is incorporated herein by reference. The GPU 150 or the processor 110 may be configured to perform the combining or stitching of the video images into the composite video images. The GPU 150 may be configured to apply the bilateral filter sequentially and separately to each incoming combined or stitched video image as it is generated by the GPU 150 or processor 110, as the case may be.

Figure 5:
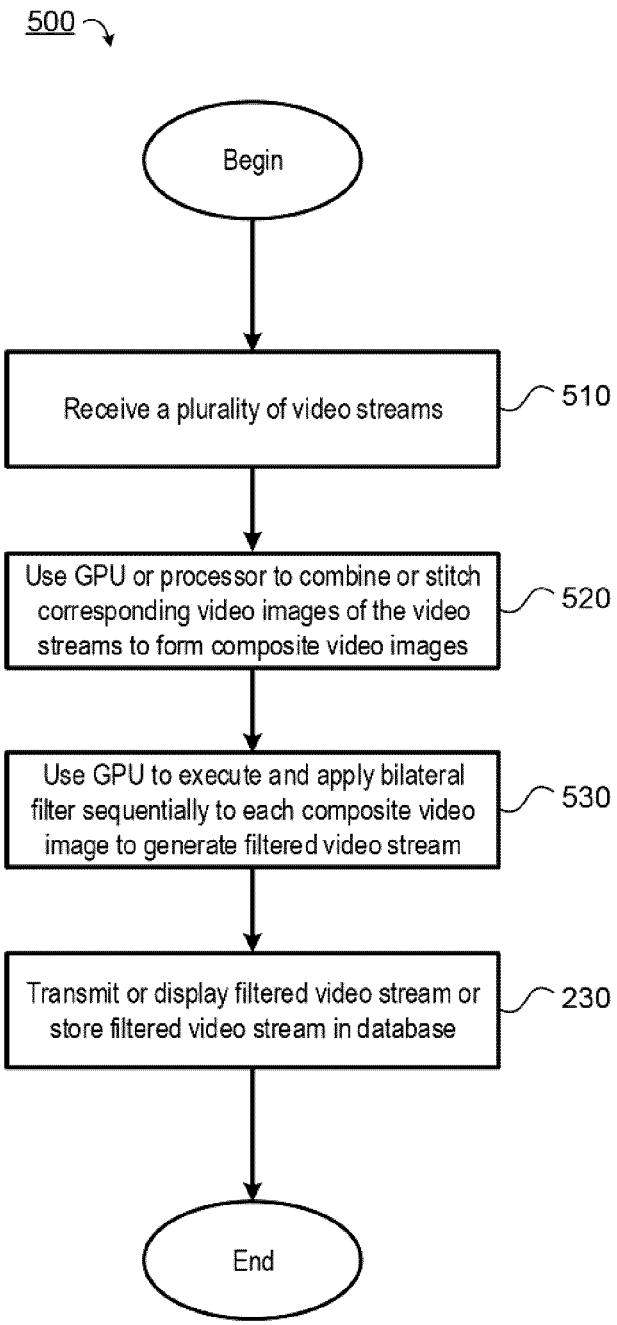
FIG. 5 is a flow chart of the video image processing method of FIG. 2 also employ combination or stitching of multiple video streams.

Accordingly, FIG. 5 shows a method 500 performable using the system 100, and which is similar to method 200 (or, alternatively, methods 300, 400). The system 100 interfaces a plurality of video cameras 140 to receive a plurality of video streams (step 510) each comprising a plurality of video images. The system 100 then uses the GPU 150 or processor 110 to combine or stitch corresponding incoming video images of the video streams as they are received to generate in real-time composite video images (step 520). The system 100 then uses the GPU 150 to execute and apply the bilateral filter in real-time and sequentially to the composite video images as they are generated and received to generate a filtered video stream or streams comprising filtered video images (step 530). The filtered video stream may then be displayed on the display 130 or stored in the database 160 (step 230). The filtered video stream may also be transmitted to a network, which may be the Internet, for storage, display, or further processing.

The additional aspects of methods 300, 400 may be combined with method 500, wherein the GPU 150 or processor 110 is configured to combine or stitch corresponding multiple video images of corresponding video streams to generate composite video images before the GPU 150 or processor 110 performs the additional aspects. For example, the GPU 150 or processor 110 may be configured to receive and compress the combined or stitched video stream, similar to step 310. Similarly, the GPU 150 or processor 110 may be configured to identify foreground and background pixels in the combined or stitched video images, where the bilateral filter is applied exclusively to the background pixels, and to apply separate foreground processing to the foreground pixels of the composite video images, similar to steps 420, 430 440. A substantial savings in processing time may be realized by such combinations, as instead of performing such processing separately on multiple different video streams, they may be performed instead on a single, combined or stitched video stream.

In the preceding description, for purposes of explanation, numerous details are set forth in order to provide a thorough understanding of the embodiments. It will be apparent to one skilled in the art, however, that these specific details may not be required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art.

In some instances, well-known hardware and software components, modules, and functions are shown in block diagram form in order not to obscure the invention. For example, specific details are not provided as to whether the embodiments described herein are implemented as a software routine, hardware circuit, firmware, or a combination thereof.

Some of the embodiments described herein include a processor and a memory storing computer-readable instructions executable by the processor. In some embodiments the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory.

Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks.

The scope of the claims should not be limited by the particular embodiments set forth herein, but should be construed in a manner consistent with the specification as a whole.

What is claimed is:

1. A computer-implemented method of processing a video stream in real-time, the method comprising:
   providing a hardware graphics processing unit (GPU) configured with a shader configured to implement a bilateral filter;
   receiving video images of the video stream;
   using the GPU shader to apply the bilateral filter to the video images of the video stream to generate a filtered video stream in real-time; and
   transmitting the filtered video stream for display on a display device or storage in a storage device,
   wherein the GPU computes the bilateral filter according to:

$$J_s \frac{1}{k_s} \sum_{p \in \Omega} I(I_p, I_s) R(p,s) I_p$$

wherein $k_s$ is:

$$k_s \sum_{p \in \Omega} I(I_p, I_s) R(p,s)$$

wherein s are the coordinates of a pixel at the center of window $\Omega$, p are the coordinates of a current pixel, $J_s$ is a resulting pixel intensity, $I_p$, $I_s$ are pixel intensities at p and s respectively, $I(I_s, I_p)$ is defined as:

$$I(I_s, I_p) = \sigma kernel(s) e^{\frac{-(I_p - I_s) \cdot (I_p - I_s)}{2(\frac{1}{\sigma})^2}}$$

wherein $I_p$ and $I_s$ are vectors defining pixel RGB colour values, R(p,s) is defined as:

$$R(p,s) = \frac{1}{\sigma} kernel(s) kernel(p_x) kernel(p_y)$$

wherein $p_x$, $p_y$ are coordinates of the current pixel with respect to a kernel size and dimension, and, $$kernel(i) = \frac{kernel(s)}{\sigma} e^{\frac{-i^2}{2\sigma^2}}$$

which is valid for:

$$i \in \left[0, \frac{(kernelSize - 1)}{2} + 1\right]$$

which is a first half of the kernel, wherein a second half of the kernel is symmetrical to the first half of the kernel.

2. The computer-implemented method according to claim 1, wherein the video images each have a resolution of at least 1920×1080 pixels.

3. The computer-implemented method according to claim 1, wherein kernel(s)=0.39894.

4. The computer-implemented method according to claim 1, wherein σ=10.0 and kernelSize=15.

5. The computer-implemented method according to claim 1, wherein the video stream is received from a camera covering an area of an airport.

6. The computer-implemented method according to claim 5, wherein the area of the airport comprises an airport apron.

7. The computer-implemented method according to claim 1, further comprising using the GPU or another processor to compress at least one video image of the filtered video stream.

8. The computer-implemented method according to claim 7, further comprising receiving a preselection of a background part of at least one video image of the video stream, wherein using the GPU shader to apply the bilateral filter to the video images of the video stream to generate the filtered video stream in real-time comprises using the GPU shader to apply the bilateral filter, with respect to the at least one video image, exclusively to the preselected background part of the at least one video image.

9. The computer-implemented method according to claim 7, wherein a background part of the at least one video image is free from sharp edges.

10. The computer-implemented method according to claim 7, comprising using the GPU or another processor to compress the at least one video image of the filtered video stream using a H.264 video compression standard.

11. The computer-implemented method according to claim 1, further comprising:
   providing the GPU or another processor configured to enhance a foreground of at least one video image of the video stream; and using the GPU or other processor to generate segmentation information identifying, in real-time, foreground pixels and background pixels in the at least one video image; and using the GPU or other processor to apply separate processing to the foreground pixels exclusive to the background pixels, the separate processing comprising at least one of: histogram equalization; edge enhancement; or highlighting.

12. The computer-implemented method according to claim 1, wherein a plurality of video streams comprises the video stream, the method comprising:

for each video stream of the plurality of video streams, receiving corresponding video images of the video stream;

using the GPU or another processor to stitch corresponding video images of the video streams in sequence to generate stitched video images; and using the GPU shader to apply the bilateral filter to the stitched video images to generate the filtered video stream in real-time.

13. A system for processing a video stream in real-time, the system comprising:

a graphics processing unit (GPU) configured with a shader configured to implement a bilateral filter, wherein the GPU is configured to receive video images of the video stream and apply the bilateral filter to the video images of the video stream to generate a filtered video stream in real-time for transmission for display on a display device or storage in a storage device, wherein the GPU is configured to compute the bilateral filter according to:

$$J_s = \frac{1}{k_s} \sum_{p \in \Omega} I(I_p, I_s) R(p, s) I_p$$

wherein $k_s$ is:

$$k_s = \sum_{p \in \Omega} I(I_p, I_s) R(p, s)$$

wherein s are the coordinates of a pixel at the center of window $\Omega$, p are the coordinates of a current pixel, $J_s$ is a resulting pixel intensity, $I_p$, $I_s$ are pixel intensities at p and s respectively, $I(I_s, I_p)$ is defined as:

$$I(I_s, I_p) = \sigma kernel(s) e^{\frac{-(I_p - I_s) \cdot (I_p - I_s)}{2(\frac{1}{\sigma})^2}}$$

wherein $I_p$ and $I_s$ are vectors defining pixel RGB colour values, R(p,s) is defined as:

$$R(p, s) = \frac{1}{\sigma} kernel(s) kernel(p_x) kernel(p_y)$$

wherein $p_x$, $p_y$ are coordinates of the current pixel with respect to a kernel size and dimension, and, $$kernel(i) = \frac{kernel(s)}{\sigma} e^{\frac{-i^2}{2\sigma^2}}$$

which is valid for:

$$i \in \left[0, \frac{(kernelSize - 1)}{2} + 1\right]$$

which is a first half of the kernel, wherein a second half of the kernel is symmetrical to the first half of the kernel.

14. The system according to claim 13, wherein kernel(s)=0.39894.

15. The system according to claim 13, wherein $\sigma$=10.0 and kernelSize=15.

16. The system according to claim 13, configured to receive the video stream from a camera covering an area of an airport.

17. The system according to claim 13, wherein the GPU or another processor of the system is configured to compress at least one video image of the filtered video stream.

18. A non-transitory computer-readable medium encoding instructions executable by a processor to perform the method according to claim 1.

* * * * *